(12) United States Patent
Yu et al.

(10) Patent No.: US 12,199,318 B2
(45) Date of Patent: Jan. 14, 2025

(54) ORDERLY DIFFERENTIATED RECYCLING AND PROCESSING APPARATUS FOR WASTE BATTERIES

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN)

(72) Inventors: Haijun Yu, Guangdong (CN); Yinghao Xie, Guangdong (CN); Aixia Li, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 18/558,301

(22) PCT Filed: Jul. 15, 2022

(86) PCT No.: PCT/CN2022/106007
§ 371 (c)(1),
(2) Date: Oct. 31, 2023

(87) PCT Pub. No.: WO2023/226178
PCT Pub. Date: Nov. 30, 2023

(65) Prior Publication Data
US 2024/0332556 A1    Oct. 3, 2024

(30) Foreign Application Priority Data

May 27, 2022 (CN) .......................... 202210585451.0

(51) Int. Cl.
*H01M 6/52* (2006.01)
*B02C 4/02* (2006.01)
(Continued)

(52) U.S. Cl.
CPC ................. *H01M 6/52* (2013.01); *B02C 4/02* (2013.01); *B02C 18/142* (2013.01); *B02C 19/22* (2013.01); *B02C 23/08* (2013.01); *Y02W 30/84* (2015.05)

(58) Field of Classification Search
CPC ........ H01M 6/52; H01M 10/54; Y02W 30/84; Y02W 30/52; B02C 4/02; B02C 4/30;
(Continued)

(56) References Cited

FOREIGN PATENT DOCUMENTS

| CN | 207149659 | 3/2018 |
| CN | 108080124 | 5/2018 |

(Continued)

OTHER PUBLICATIONS

International Search Report and Written Opinion issued for the PCT application No. PCT/CN2022/106007 on Dec. 20, 2022 with English translation (12 pages).

*Primary Examiner* — Matthew P Travers
(74) *Attorney, Agent, or Firm* — Leason Ellis LLP (57) ABSTRACT

Disclosed is an orderly differentiated recycling and processing apparatus for waste batteries, including an apparatus housing, where several crushing cavities are arranged inside the apparatus housing along a length direction, crushing modules are provided inside each of the crushing cavities, servo cavities are provided inside the apparatus housing at both sides of the crushing cavities, several cutting modules are symmetrically arranged inside the servo cavities facing the crushing cavities, and a screen assembly is provided inside the apparatus housing below the crushing module.

9 Claims, 5 Drawing Sheets

(51) Int. Cl.
*B02C 18/14* (2006.01)
*B02C 19/22* (2006.01)
*B02C 23/08* (2006.01)

(58) Field of Classification Search
CPC ....... B02C 18/06; B02C 18/14; B02C 18/142;
B02C 19/0062; B02C 19/22; B02C 23/08;
Y10T 29/49751; Y10T 29/49755
See application file for complete search history.

(56) References Cited

FOREIGN PATENT DOCUMENTS

| | | | | |
|---|---|---|---|---|
| CN | 110201982 | | 9/2019 | |
| CN | 111589504 | | 8/2020 | |
| CN | 112058458 | | 12/2020 | |
| CN | 112331948 A | * | 2/2021 | ............... B09B 3/00 |
| CN | 112742562 | | 5/2021 | |
| CN | 112871288 A | * | 6/2021 | ............. B02C 23/04 |
| CN | 112871989 | | 6/2021 | |
| CN | 112916584 | | 6/2021 | |
| CN | 112973904 A | * | 6/2021 | |
| CN | 215878261 U | * | 2/2022 | |
| CN | 114204062 | | 3/2022 | |
| KR | 101807694 | | 1/2018 | |

* cited by examiner

ORDERLY DIFFERENTIATED RECYCLING AND PROCESSING APPARATUS FOR WASTE BATTERIES

CROSS-REFERENCE TO RELATED APPLICATION

This application is a national stage filing under 35 U.S.C. § 371 of international application number PCT/CN2022/106007, filed Jul. 15, 2022, which claims priority to Chinese patent application No. 202210585451.0, filed May 27, 2022. The contents of these applications are incorporated herein by reference in their entirety.

TECHNICAL FIELD

The present invention relates to the technical field of waste battery recycling, and more particularly, to an orderly differentiated recycling and processing apparatus for waste batteries.

BACKGROUND

Scientific research shows that an ordinary battery abandoned in nature can pollute 600,000 liters of water, equivalent to a person's lifetime water consumption, and China consumes 7 billion such batteries every year. It is understood that 96% of the batteries produced in our country are zinc-manganese batteries and alkaline-manganese batteries, with their main components being manganese, mercury, zinc and other heavy metals. Whether waste batteries are in the atmosphere or buried deep underground, the heavy metal components of the waste batteries will overflow with the seepage, causing pollution of groundwater and soil, which will seriously endanger human health over time. Mercury, cadmium, zinc, lead and chromium were listed as hazardous wastes in the *National Catalogue of Hazardous Wastes*, 1998.

After waste batteries are scrapped, there are still many recyclable substances inside. For example, precious metals and graphite contained in metal electrode sheets, and even plastic or metal shells used to protect waste batteries can all be recycled. In the process of mechanized recycling of waste batteries, the existing apparatus needs to crush and grind the waste batteries, and the crushed and ground slag is further screened and then recycled and extracted in different ways according to different materials.

The disadvantages lie in that a whole waste battery is directly fed into a crushing and grinding apparatus for processing, resulting in mixing of the slag after grinding with wastes of many materials, which increases the difficulty of post recycling. In addition, the rough crushing in a disorderly manner also increases the amount of crushing, resulting in a low recycling efficiency. In view of this, the present applicant provides an efficient waste battery recycling and processing apparatus capable of orderly distinguishing external shells and internal electrode sheets for targeted grinding and crushing processing.

SUMMARY

The present invention aims to provide an orderly differentiated recycling and processing apparatus for waste batteries, so as to solve the problems raised in the background.

To achieve the above-mentioned object, the present invention provides a following technical scheme: an orderly differentiated recycling and processing apparatus for waste batteries, including an apparatus housing, where several crushing cavities are arranged inside the apparatus housing along a length direction, a crushing module is provided inside each of the crushing cavities, servo cavities are provided inside the apparatus housing at both sides of the crushing cavities, several cutting modules are symmetrically arranged inside the servo cavities facing the crushing cavities, and a screen assembly is provided inside the apparatus housing below the crushing module.

The crushing module includes several crushing rollers which are horizontally mounted inside the crushing cavities by using bearings. Crushing shovel plates are spirally arranged at outer sides of the crushing rollers along the same direction with a gap existing between two adjacent crushing shovel plates. A first motor used for driving the crushing rollers to rotate is mounted inside the apparatus housing, and two adjacent crushing rollers inside the crushing cavity rotate in opposite directions.

The cutting module includes a mounting plate mounted inside the servo cavity. An industrial six-axis robot arm used for driving the mounting plate to lift and translate is mounted inside the servo cavity. Several mounting bases are arranged corresponding to the crushing cavities on the mounting plate. First cutting blades and second cutting blades are evenly arranged at equal intervals on one side of an outer side wall of the mounting bases close to the crushing cavities. The first cutting blades and the second cutting blades are all spirally arranged parallel to the crushing rollers, and adjacent first cutting blade and second cutting blade are staggered. A second motor used for driving the first cutting blades and the second cutting blades to rotate is mounted on the mounting base. An opening for movable use of the first cutting blades and the second cutting blades is provided in the side wall of the crushing cavity. Helical angles of the first cutting blades and the second cutting blades are the same as that of the crushing shovel plates, and the first cutting blades and the second cutting blades have opposite helical directions.

An extrusion plate is arranged inside each of the crushing cavities above the crushing module in a lifting manner. Extrusion rods are evenly arranged at equal intervals at the bottom of the extrusion plate along a gap extending direction.

Preferably, the crushing module also includes a rubber airbag spirally arranged along an edge side wall direction of the crushing shovel plates. The rubber airbag is used for preventing sliding and adjusting the gap between two adjacent crushing shovel plates.

Preferably, the cutting module further includes several reinforcing rods arranged parallel to the first cutting blades and the second cutting blades. The reinforcing rods are arranged in one-to-one alignment with the first cutting blades and the second cutting blades, and are provided with slides used for increasing the stability of the first cutting blades and the second cutting blades.

Preferably, the screen assembly includes a screen plate arranged along the length direction of the apparatus housing. One end of the screen plate extends to an end face inside the apparatus housing, and the other end of the screen plate extends to the outside of the apparatus housing. A side wall of the apparatus housing is provided with a crushed shell outlet that is adapted to the screen plate. A conveyor belt is provided inside the apparatus housing below the screen plate. One end of the conveyor belt extends to a same vertical plane as the crushed shell outlet, and the other end of the conveyor belt extends to the outside of the apparatus housing. The side wall of the apparatus housing is provided with a powder residue outlet adapted to the conveyor belt.

Preferably, the screen plate is hingedly arranged inside the apparatus housing. One end inside the apparatus housing is provided with a hinge seat used for fixing the screen plate, and both sides of the other end inside the apparatus housing are provided with cylinders used for driving the screen plate to flip over. A buffer spring is provided between the screen plate and the cylinders as well as between the screen plate and the hinge seat.

Preferably, a protective frame is provided at the edge of a top end of the screen plate, the end of the protective frame close to the crushed shell outlet is open, and a vibration motor is mounted on the protective frame.

Preferably, several electric telescopic rods used for driving the extrusion plates to lift and lower are mounted vertically downward on the top of the apparatus housing, and the output ends of the electric telescopic rods are connected to the extrusion plate.

Preferably, feed ports are provided on the top side of the apparatus housing above the crushing cavities. Feed hoppers are provided on the top of the apparatus housing on one side of the feed ports, and the bottoms of the feed hoppers are connected with conduits that extend inside the feed ports.

Preferably, an output end of the first motor is connected with a drive shaft, a gear set used for transmission is provided between the drive shaft and the crushing roller, and output ends of two adjacent gear sets rotate in opposite directions.

Compared with the prior art, the beneficial effects of the present invention are: according to the present invention, when waste dry batteries are crushed for recycling, the purpose of orderly crushing and recycling in view of a columnar shape of waste dry batteries that brings difficulty in sorting and a characteristic of a plurality of internal and external layers can be realized. In the process of recycling dry batteries, the dry battery shells are cut in an orderly and stable manner by alternately using the first cutting blades and the second cutting blades with opposite helical directions to form diamond-like fragments. Meanwhile, the crushing modules are used to peel off the crushed shells of dry batteries and complete paste or powder electrolytes to finally reveal complete cathode bars, so that dry batteries, when recycled, are separated to form debris-like shells, powder-loose electrolytes, complete cathode bars, etc., thereby being greatly beneficial to the purpose of subsequent classification and recycling of dry batteries. In addition, the apparatus has a high degree of automation, and is easy to produce and use efficiently and safely.

REFERENCE NUMERALS

1, Conveyor Belt; 2, Servo Cavity; 3, Crushing Cavity; 4, Cutting Module; 5, Screen Plate; 6, Mounting Base; 7, Mounting Plate; 8, Apparatus Housing; 9, Crushing Module; 10, Conduit; 11, Electric Telescopic Rod; 12, Feed Port; 13, Feed Hopper; 14, Reinforcing Rod; 15, First Cutting blade; 16, Second Cutting blade; 17, Second Motor; 18, Crushing Shovel Plate; 19, Rubber Airbag; 20, First Motor; 21, Drive Shaft; 22, Gear Set; 23, Crushing Roller; 24, Extrusion Rod; 25, Extrusion Plate; 26, Vibration Motor; 27, Protective Frame; 28, Cylinder; and 29, Hinge Seat.

DETAILED DESCRIPTION

The technical schemes in the embodiments of the present invention will be clearly and completely described below in conjunction with the drawings in the embodiments of the present invention. Obviously, the described embodiments are only some embodiments of the present invention, but not all embodiments. Based on the embodiments of the present invention, all the other embodiments obtained by those having ordinary skill in the art without creative efforts belong to the scope of protection of the present invention.

Referring to FIG. 1 to FIG. 7, an embodiment of the present invention provides an orderly differentiated recycling and processing apparatus for waste batteries, including an apparatus housing 8. Several crushing cavities 3 are arranged inside the apparatus housing 8 along a length direction. Specifically, the number of the crushing cavities 3 is adjusted based on the required output and the available area of the workshop, and the larger the number of the crushing cavities 3, the longer the length direction of the apparatus housing 8 and the higher the processing efficiency. A crushing module 9 is provided inside each of the crushing cavities 3. Servo cavities 2 are provided inside the apparatus housing 8 at both sides of the crushing cavities 3. Several cutting modules 4 are symmetrically arranged inside the servo cavities 2 facing the crushing cavities 3. The number of the cutting modules 4 on the same side is the same as the number of the crushing cavities 3, and a screen assembly is provided inside the apparatus housing 8 below the crushing module 9.

Figure 1:
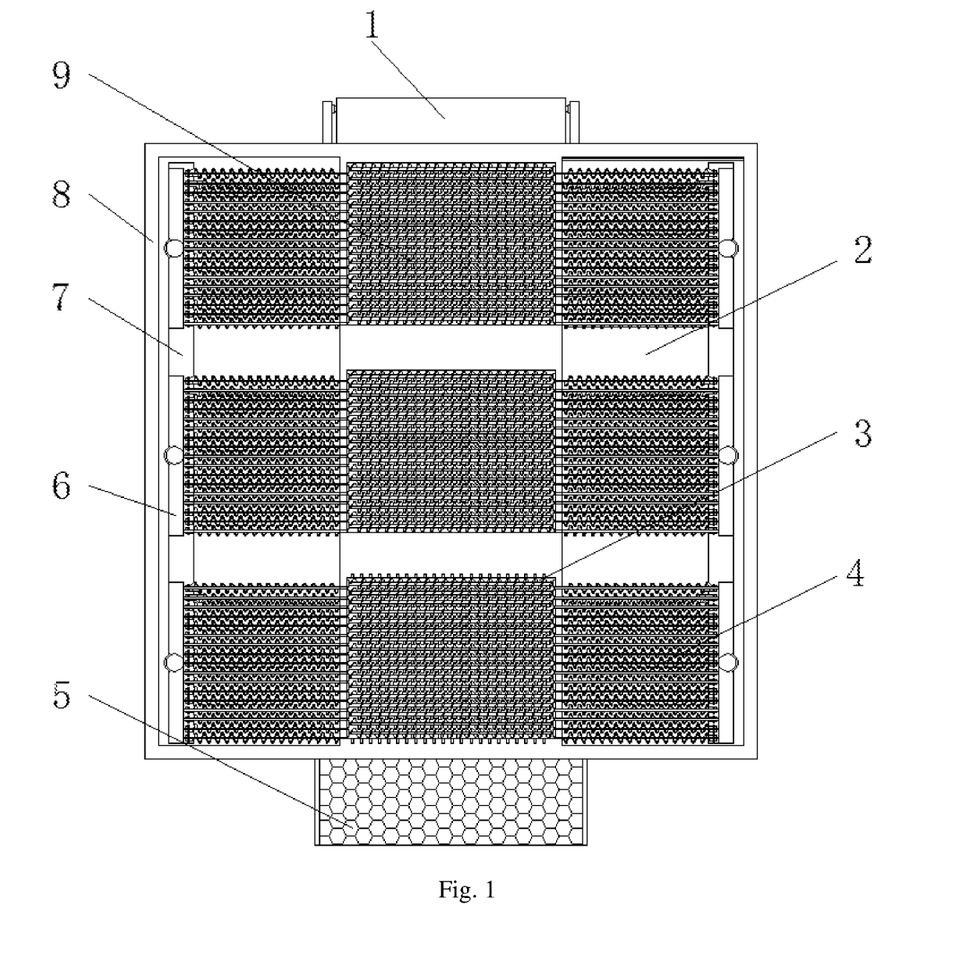
FIG. 1 is a schematic structural top view of the interior according to the present invention.
Figure 2:
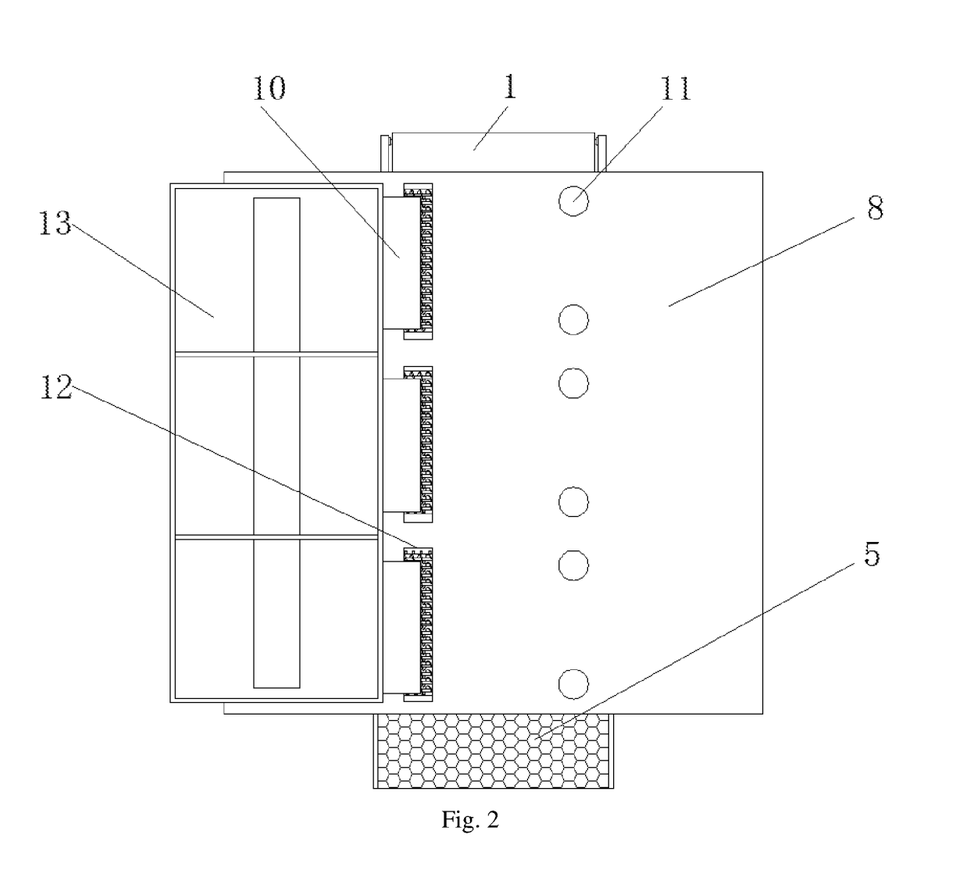
FIG. 2 is a schematic structural top view according to the present invention.

Further, feed ports 12 are provided on the top side of the apparatus housing 8 above the crushing cavities 3. Feed hoppers 13 are provided on the top of the apparatus housing 8 on one side of the feed ports 12, and the bottoms of the feed hoppers 13 are connected with conduits 10 that extend inside the feed ports 12, so that an appropriate number of dry batteries to be recycled can be fed into each crushing cavity 3 through the feeding hopper 13 for crushing and recycling.

Figure 4:
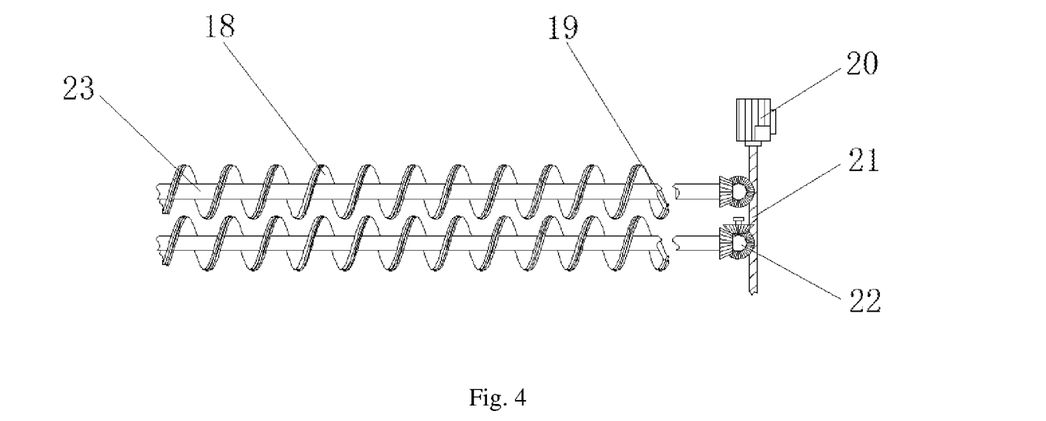
FIG. 4 is an enlarged schematic structural partial top view of a crushing module according to the present invention.
Figure 6:
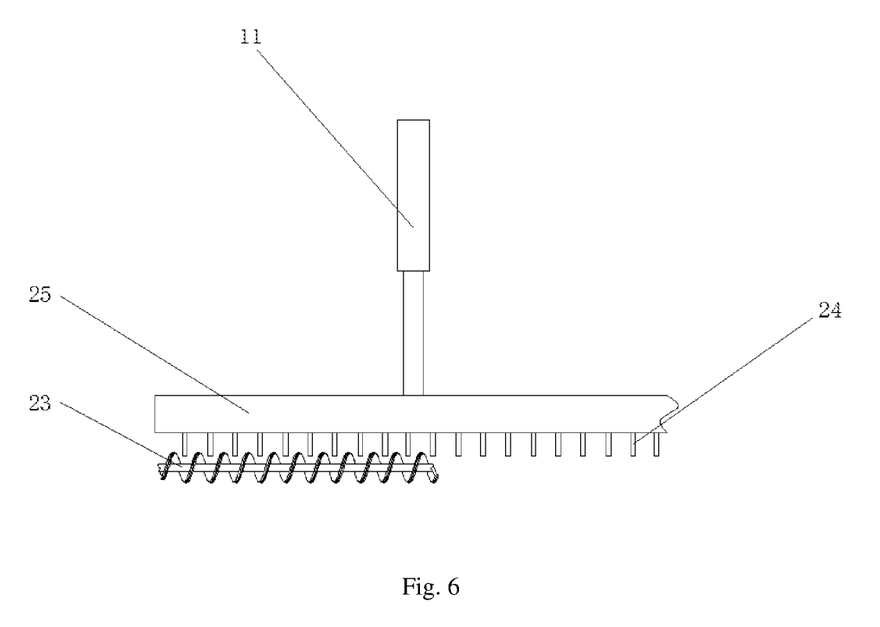
FIG. 6 is a schematic structural partial side view of parts of the crushing module according to the present invention.

Specifically, the crushing module 9 includes several crushing rollers 23 which are horizontally mounted inside the crushing cavity 3 by using a bearing. Crushing shovel plates 18 are spirally arranged at outer sides of the crushing roller 23 along the same direction with a gap existing between two adjacent crushing shovel plates 18. The actual combination shape of the crushing roller 23 and the crushing shovel plates 18 is similar to an auger, which is mainly used for sorting and arranging dry batteries and crushing and scraping electrolytes after the cutting. Further, the larger the number of helical turns of the crushing shovel plates 18 within a unit length of the crushing rollers 23, the better the crushing effect thereof, but the size of the gaps should be controlled to be greater than or equal to the diameter of cathode bars inside the dry batteries, which is convenient for the cathode bars to fall completely. A first motor 20 used for driving the crushing rollers 23 to rotate are mounted inside the apparatus housing 8. As one driving method of using the first motor 20 to drive the crushing rollers 23 to rotate, an output end of the first motor 20 is connected with a drive shaft 21, a gear set 22 used for transmission is provided between the drive shaft 21 and the crushing roller 23. Providing gears between the drive shaft 21 and the crushing roller 23 to realize transmission can be understood by those skilled in the art, and will not be repeated here. As a preferred rotation condition, rotation directions of output ends of two adjacent gear sets 22 can be set opposite, that is, in the two adjacent gear sets 22, the number of gears in one gear set 22 being greater than the number of gears in the other gear set 22 can realize the change of rotation direction of a driving force, so that two adjacent crushing rollers 23 inside the crushing cavity 3 rotate in opposite directions. The purpose lies in that after entering the crushing cavities 3, the dry batteries will accumulate between two adjacent crushing rollers 23, and the crushing rollers 23 drive the crushing shovel plates 18 to continue rotating in this case. After rotation of the crushing shovel plates 18 arranged in reverse rotation for a period of time, the arrangement of reverse rotation generates upward sliding of dry batteries, in combination with lateral friction of the helix, a translational conveying of the dry batteries from left to right is generated. At the same time, the accumulated dry batteries will extend to both sides, so that the dry batteries can be filled in a horizontal state as much as possible into the gaps between adjacent crushing shovel plates 18 and be arranged end to end as much as possible, which can play a role of sorting the dry batteries, and at the same time, can speed up the peeling for use after cutting.

However, in the actual production and use process, two adjacent crushing rollers 23 are not only limited to rotate in opposite directions, but can also rotate in a controllable manner by adjusting the rotation of the two adjacent crushing rollers 23 in the same direction or opposite directions. For example, another first motor 20 is installed to make one of the first motors 20 drive the crushing rollers 23 at positions 1, 3, 5, 7 . . . , to rotate, and another first motor 20 drives the crushing rollers 23 at positions 2, 4, 6, 8 . . . , to rotate, so that the crushing rollers 23 may rotate in various ways, and the crushing effect is better.

Since cathode bars inside dry batteries may be different in diameter and the dry batteries are easy to slip during the cutting and crushing process, the crushing module 9 also includes a rubber airbag 19 spirally arranged along an edge side wall direction of the crushing shovel plates 18. The rubber airbag 19 is controlled by an air pump and a pressure relief valve for gas injection inflation and pressure relief, so that the rubber airbag 19 is used for preventing sliding and adjusting the gap between two adjacent crushing shovel plates 18.

Figure 3:
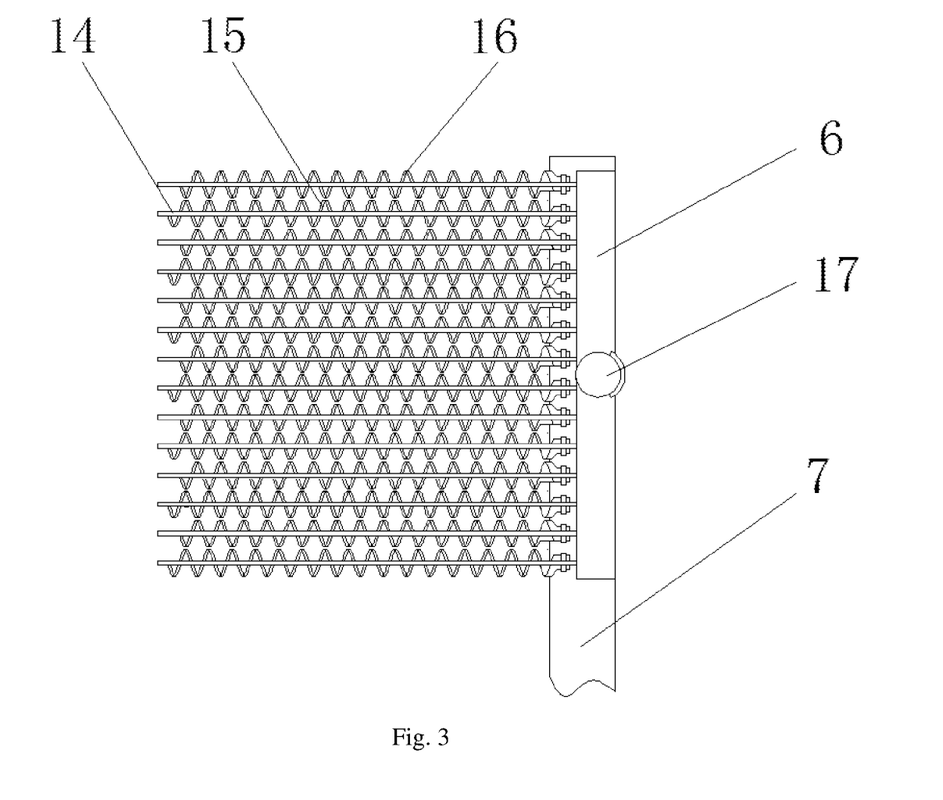
FIG. 3 is an enlarged schematic structural top view of cutting modules according to the present invention.

The cutting module 4 includes a mounting plate 7 mounted inside the servo cavity 2. An industrial six-axis robot arm used for driving the mounting plate 7 to lift and translate is mounted inside the servo cavity 2. Several mounting bases 6 are arranged corresponding to the crushing cavities 3 on the mounting plate 7. First cutting blades 15 and second cutting blades 16 are evenly arranged at equal intervals on one side of an outer side wall of the mounting bases 6 close to the crushing cavities 3. The first cutting blades 15 and the second cutting blades 16 are all spirally arranged parallel to the crushing rollers 23, and adjacent first cutting blade 15 and second cutting blade 16 are staggered. A second motor 17 used for driving the first cutting blades 15 and the second cutting blades 16 to rotate is mounted on the mounting base 6. Similarly, an output end of the second motor 17 is connected to the first cutting blades 15 and the second cutting blades 16 by means of transmission parts (gears). An opening for movable use of the first cutting blades 15 and the second cutting blades 16 is provided in the side wall of the crushing cavity 3. Helical angles of the first cutting blades 15 and the second cutting blades 16 are the same as that of the crushing shovel plates 18, and the first cutting blades 15 and the second cutting blades 16 have opposite helical directions.

Figure 5:
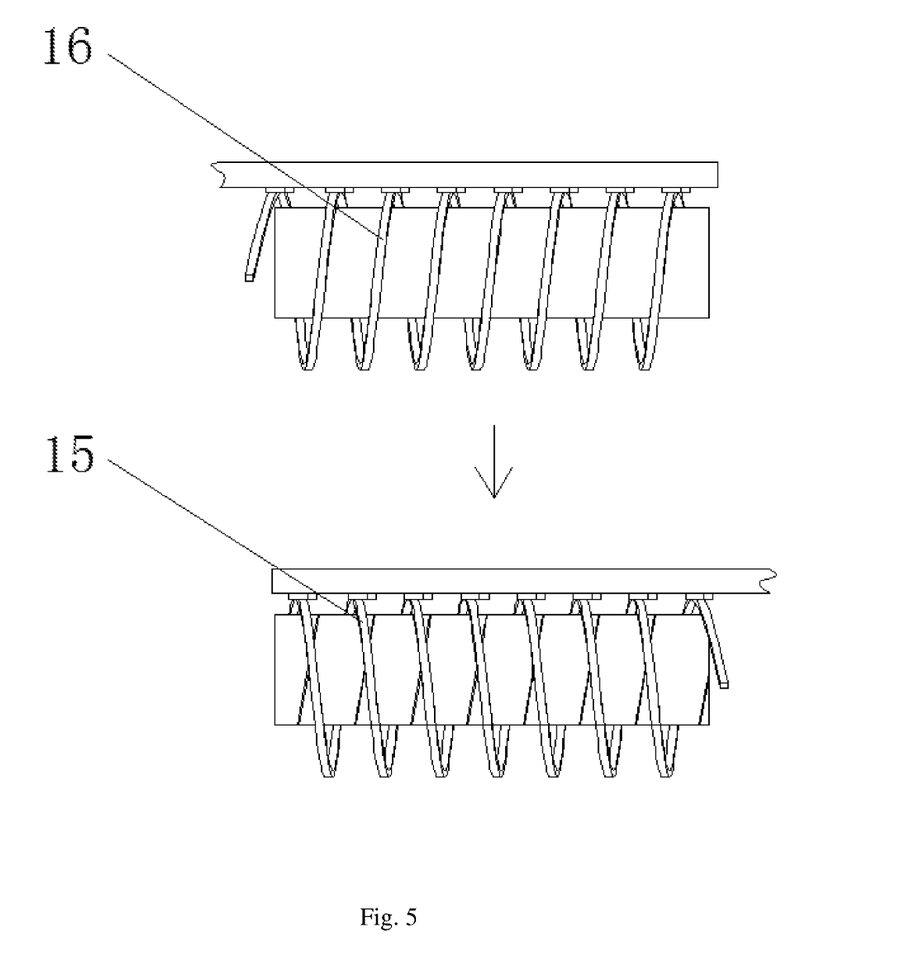
FIG. 5 is a schematic diagram of a cutting state according to the present invention.

In use, the first cutting blades 15 and the second cutting blades 16 rotate and enter the crushing cavity 3 in a manner of keeping the axis aligned with the dry batteries. Inner widths of the first cutting blades 15 and the second cutting blades 16 are larger than the diameter of the dry batteries. In this case, the neatly placed dry batteries will not be collided and squeezed, only the stacked dry batteries are squeezed to make the same further neatly placed. For example, when some dry batteries are stacked, the dry batteries above will be squeezed during the feeding process of the first cutting blades 15 and the second cutting blades 16 to make the dry batteries better sorted and neatly placed. When the first cutting blades 15 and the second cutting blades 16 on both sides completely extend into the crushing cavities 3, the first cutting blades 15 and the second cutting blades 16 are wrapped around the outside of the dry batteries at this time.

When cutting for the first time, the first cutting blades 15 and the second cutting blades 16 are pressed down as a whole to produce extrusion on the dry batteries, and then rotate and move out of the crushing cavity 3. The helical first cutting blades 15 and second cutting blades 16 are used to cut zinc or stainless steel skins on the outside of the dry batteries without affecting the state of internal electrolytes and cathode materials at the same time, until the first cutting blades 15 and the second cutting blades 16 completely exit the crushing cavity 3. When cutting for the second time, the first cutting blades 15 and the second cutting blades 16 translate as a whole by a length of one spacing unit to adjust the position with respect to the first cutting, so that the first cutting blades 15 and the second cutting blades 16 produce staggered cutting lines for similar cutting after extension. At this time, the state of internal electrolytes and cathode materials will not be affected, but the materials wrapped on surface layers have been cut into pieces. Crushing and scrapping can be performed after the first cutting blades 15 and the second cutting blades 16 are retracted and reset.

In order to increase the stability of the first cutting blades 15 and the second cutting blades 16, the cutting module further include several reinforcing rods 14 arranged parallel to the first cutting blades 15 and the second cutting blades 16. The reinforcing rods 14 are arranged in one-to-one alignment with the first cutting blades 15 and the second cutting blades 16, and are provided with slides used for increasing the stability of the first cutting blades 15 and the second cutting blades 16. The slides are provided with sliding rails adapted to the first cutting blades 15 and the second cutting blades 16 to increase the running stability. Inner sides of the first cutting blades 15 and the second cutting blades 16 are provided with cutting edges or components having a cutting effect, such as water cutting.

An extrusion plate 25 is arranged inside each of the crushing cavities 3 above the crushing module 9 in a lifting manner. Several electric telescopic rods 11 used for driving the extrusion plates 25 to lift and lower are mounted vertically downward on the top of the apparatus housing 8. Output ends of the electric telescopic rods 11 are connected to the extrusion plate 25, and extrusion rods 24 are evenly arranged at equal intervals at the bottom of the extrusion plate 25 along a gap extending direction. When in use, the extrusion plate 25 is pressed down, and the crushing rollers 23 rotate again to produce helical friction of the crushing shovel plates 18, so that the cut sheets and electrolytes will all be scraped off and drop.

Figure 7:
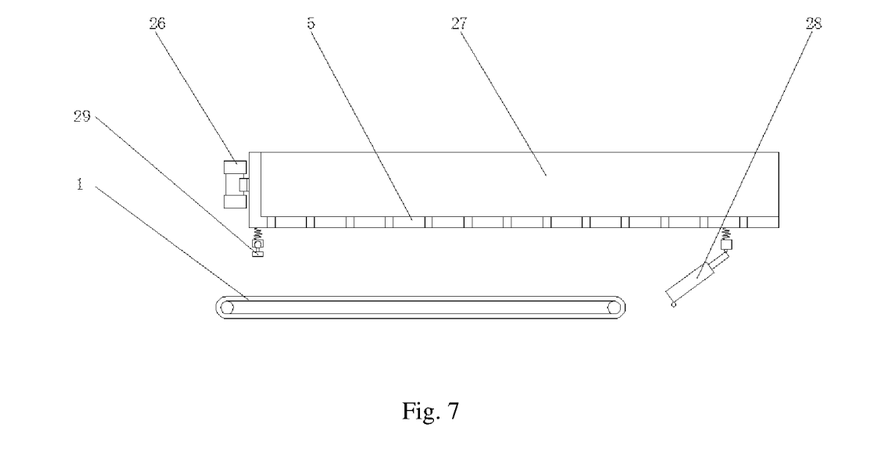
FIG. 7 is a schematic structural side view of the interior of a screen assembly according to the present invention.

The screen assembly includes a screen plate 5 arranged along the length direction of the apparatus housing 8. One end of the screen plate 5 extends to an end face inside the apparatus housing 8, and the other end of the screen plate 5 extends to the outside of the apparatus housing 8. A side wall of the apparatus housing 8 is provided with a crushed shell outlet that is adapted to the screen plate 5. A conveyor belt 1 is provided inside the apparatus housing 8 below the screen plate 5. One end of the conveyor belt 1 extends to a same vertical plane as the crushed shell outlet, and the other end of the conveyor belt 1 extends to the outside of the apparatus housing 8. The side wall of the apparatus housing 8 is provided with a powder residue outlet adapted to the conveyor belt 1. The screen plate 5 is hingedly arranged inside the apparatus housing 8. One end inside the apparatus housing 8 is provided with a hinge seat 29 for fixing the screen plate 5, and both sides of the other end inside the apparatus housing 8 are provided with cylinders 28 for driving the screen plate 5 to flip over. A buffer spring is provided between the screen plate 5 and the cylinders 28 as well as between the screen plate 5 and the hinge seat 29. A protective frame 27 is provided at the edge of a top end of the screen plate 5. An end of the protective frame 27 close to the crushed shell outlet is open, and a vibration motor 26 is mounted on the protective frame 27.

The screen plate 5 can be inclined left and right in any direction. When screening and collecting, the electrolytes fall to the conveyor belt 1, the sheets are inclined to the left by the screen plate 5 for fixed-point collection, and the residual columnar cathode bars finally fall. The cathode bars are inclined to the right by the screen plate 5 for fixed-point distinguished collection, so as to facilitate the automatic classification, collection and use of waste dry batteries.

It will be apparent to those skilled in the art that the present invention is not limited to the details of the above-mentioned exemplary embodiments, and that the present invention can be implemented in other specific forms without departing from the spirit or essential features of the present invention. Therefore, from any point of view, the embodiments should be regarded as exemplary and non-limiting. The scope of the present invention is defined by the appended claims rather than the foregoing description, and it is therefore intended that all changes that fall within the meaning and scope of equivalents of the claims are included within the present invention. No reference signs in the claims should be construed as limiting the claims referred to.

The invention claimed is:

1. An apparatus for differentiated recycling and processing waste batteries, comprising an apparatus housing (8), wherein plural crushing cavities (3) are arranged inside the apparatus housing (8) along a length direction, a crushing module (9) is provided inside each of the crushing cavities (3), servo cavities (2) are provided inside the apparatus housing (8) at two sides of the crushing cavities (3), plural cutting modules (4) are symmetrically arranged inside the servo cavities (2) facing the crushing cavities (3), and a screen assembly is provided inside the apparatus housing (8) below the crushing modules (9);

each crushing module (9) comprises plural crushing rollers (23) which are horizontally mounted inside each crushing cavity (3) by using a bearing, crushing shovel plates (18) are spirally arranged at outer sides of the crushing rollers (23) along a same direction as the crushing rollers with a gap existing between two adjacent crushing shovel plates (18), a first motor (20) used for driving the crushing rollers (23) to rotate is mounted inside the apparatus housing (8), and two adjacent crushing rollers (23) inside the crushing cavity (3) rotate in opposite directions;

the cutting modules (4) comprises a mounting plate (7) mounted inside a respective servo cavity (2), an industrial six-axis robot arm used for driving the mounting plate (7) to lift and translate is mounted inside the respective servo cavity (2), plural mounting bases (6) are arranged corresponding to the crushing cavities (3) on the mounting plate (7), first cutting blades (15) and second cutting blades (16) are evenly arranged at equal intervals on one side of an outer side wall of the mounting bases (6) adjacent the crushing cavities (3), the first cutting blades (15) and the second cutting blades (16) are all spirally arranged parallel to the crushing rollers (23), adjacent first cutting blades (15) and second cutting blades (16) are staggered, a second motor (17) used for driving the first cutting blades (15) and the second cutting blades (16) to rotate is mounted on each mounting base (6), an opening for movable use of the first cutting blades (15) and the second cutting blades (16) is provided in a side wall of each crushing cavity (3), helical angles of the first cutting blades (15) and the second cutting blades (16) are the same as helical angles of the crushing shovel plates (18), and the first cutting blades (15) and the second cutting blades (16) have opposite helical directions; and an extrusion plate (25) is arranged inside each of the crushing cavities (3) above the crushing modules (9) in a lifting manner, and extrusion rods (24) are evenly arranged at equal intervals at a bottom of each extrusion plate (25) along a gap extending direction.

2. The apparatus for differentiated recycling and processing waste batteries of claim 1, wherein each crushing module (9) further comprises a rubber airbag (19) spirally arranged along an edge side wall direction of the crushing shovel plates (18), and the rubber airbag (19) is used for preventing sliding and adjusting the gap between two adjacent crushing shovel plates (18).

3. The apparatus for differentiated recycling and processing waste batteries of claim 1, wherein the cutting module further comprises plural reinforcing rods (14) arranged parallel to the first cutting blades (15) and the second cutting blades (16), the reinforcing rods (14) are arranged in one-to-one alignment with the first cutting blades (15) and the second cutting blades (16), and are provided with slides used for increasing the stability of the first cutting blades (15) and the second cutting blades (16).

4. The apparatus for differentiated recycling and processing waste batteries of claim 1, wherein the screen assembly comprises a screen plate (5) arranged along the length direction of the apparatus housing (8), one end of the screen plate (5) extends to an end face inside the apparatus housing (8), another end of the screen plate (5) extends to an outside of the apparatus housing (8), a side wall of the apparatus housing (8) is provided with a crushed shell outlet that is adapted to the screen plate (5), a conveyor belt (1) is provided inside the apparatus housing (8) below the screen plate (5), one end of the conveyor belt (1) extends to a same vertical plane as the crushed shell outlet, another end of the conveyor belt (1) extends to the outside of the apparatus housing (8), and the side wall of the apparatus housing (8) is provided with a powder residue outlet that is adapted to the conveyor belt (1).

5. The apparatus for differentiated recycling and processing waste batteries of claim 4, wherein the screen plate (5) is hingedly arranged inside the apparatus housing (8), one end inside the apparatus housing (8) is provided with a hinge seat (29) used for fixing the screen plate (5), two sides of another end inside the apparatus housing (8) are provided with cylinders (28) used for driving the screen plate (5) to flip over, and a buffer spring is provided between the screen plate (5) and the cylinders (28) as well as between the screen plate (5) and the hinge seat (29).

6. The apparatus for differentiated recycling and processing waste batteries of claim 4, wherein a protective frame (27) is provided at an edge of a top end of the screen plate (5), an end of the protective frame (27) adjacent the crushed shell outlet is open, and a vibration motor (26) is mounted on the protective frame (27).

7. The apparatus for differentiated recycling and processing waste batteries of claim 1, wherein plural electric telescopic rods (11) used for driving the extrusion plates (25) to lift and lower are mounted vertically downward on a top of the apparatus housing (8), and output ends of the electric telescopic rods (11) are connected to the extrusion plates (25).

8. The apparatus for differentiated recycling and processing waste batteries of claim 1, wherein a feed port (12) is provided on a top side of the apparatus housing (8) above each crushing cavity (3), a feed hopper (13) is provided on the top of the apparatus housing (8) on one side of each feed port (12), and a bottom of each feed hopper (13) is connected with a conduit (10) that extends into the respective feed port (12).

9. The apparatus for differentiated recycling and processing waste batteries of claim 1, wherein an output end of the first motor (20) is connected with a drive shaft (21), a gear set (22) used for transmission is provided between the drive shaft (21) and the crushing rollers (23), and output ends of two adjacent gear sets (22) rotate in opposite directions.

* * * * *